United States Patent
Chung et al.

(10) Patent No.: US 9,169,140 B2
(45) Date of Patent: Oct. 27, 2015

(54) NON-PRECIOUS METAL CATALYSTS PREPARED FROM PRECURSOR COMPRISING CYANAMIDE

(75) Inventors: Hoon Taek Chung, Los Alamos, NM (US); Piotr Zelenay, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 722 days.

(21) Appl. No.: 13/239,109

(22) Filed: Sep. 21, 2011

(65) Prior Publication Data

US 2012/0070764 A1 Mar. 22, 2012

Related U.S. Application Data

(60) Provisional application No. 61/384,883, filed on Sep. 21, 2010, provisional application No. 61/408,129, filed on Oct. 29, 2010.

(51) Int. Cl.
| | |
|---|---|
| H01M 4/90 | (2006.01) |
| C02F 1/70 | (2006.01) |
| B01J 23/745 | (2006.01) |
| B01J 27/043 | (2006.01) |
| B01J 27/24 | (2006.01) |
| B09C 1/00 | (2006.01) |
| C02F 1/66 | (2006.01) |
| C02F 103/06 | (2006.01) |

(52) U.S. Cl.
CPC ............... *C02F 1/70* (2013.01); *B01J 23/745* (2013.01); *B01J 27/043* (2013.01); *B01J 27/24* (2013.01); *B09C 1/002* (2013.01); *H01M 4/9041* (2013.01); *H01M 4/9083* (2013.01); *C02F 1/66* (2013.01); *C02F 2103/06* (2013.01); *C02F 2209/06* (2013.01); *C02F 2209/22* (2013.01)

(58) Field of Classification Search
CPC . H01M 4/9041; H01M 4/9083; B01J 23/745; B01J 27/043; B01J 27/024
USPC .......................................... 429/527, 532, 533
See application file for complete search history.

(56) References Cited

U.S. PATENT DOCUMENTS

| | | | |
|---|---|---|---|
| 7,629,285 B2 | 12/2009 | Popov | |
| 2005/0287689 A1 | 12/2005 | Iwaki | |
| 2010/0183950 A1* | 7/2010 | Dai | ............................... 429/513 |

(Continued)

OTHER PUBLICATIONS

Chung et al. "Synthesis and Evaluation of Heat-treated, Cyanamide-derived Non-precious Catalyst for Oxygen Reduction", ECS Trans., 25 (1) 485-492 (2009).*

(Continued)

*Primary Examiner* — Zachary Best
(74) *Attorney, Agent, or Firm* — Samuel L. Borkowsky

(57) ABSTRACT

Catalyst comprising graphitic carbon and methods of making thereof; said graphitic carbon comprising a metal species, a nitrogen-containing species and a sulfur containing species. A catalyst for oxygen reduction reaction for an alkaline fuel cell was prepared by heating a mixture of cyanamide, carbon black, and a salt selected from an iron sulfate salt and an iron acetate salt at a temperature of from about 700° C. to about 1100° C. under an inert atmosphere. Afterward, the mixture was treated with sulfuric acid at elevated temperature to remove acid soluble components, and the resultant mixture was heated again under an inert atmosphere at the same temperature as the first heat treatment step.

5 Claims, 10 Drawing Sheets

(56) References Cited

U.S. PATENT DOCUMENTS

2010/0276644 A1    11/2010    Wolf
2011/0281719 A1*  11/2011    Liu et al. .......................... 502/1

OTHER PUBLICATIONS

Wang et al. "Effect of the Pre-Treatment of Carbon Black Supports on the Activity of Fe-Based Electrocatalysts for the Reduction of Oxygen", J. Phys. Chem. B (1999), 103, 2042-2049.*

Jaouen et al., "Oxygen Reduction Catalysts for Polymer Electrolyte Fuel Cells from the Pyrolysis of Iron Acetate Adsorbed on Various Carbon Supports", J. Phys. Chem. B (2003), 107, 1376-1386.*

Becker et al., "Efficient access to bamboo-like carbon micro and nanofibers by pyrolysis of zinc cyanamide," J. Phys. And Chem. of Solids, 2001, vol. 62, pp. 1431-1433.

Becker et al., "Zinc cyanamide, $Zn(CN)_2$," Acta Crystallographica Section C., 2001, vol. 57, pp. 347-348.

Biddinger et al., "Effect of sulfur as a growth promoter for CNx nanostructures as PEM and DMFC ORR catalysts," Appl. Catal. B, 2010, vol. 96, pp. 72-82, available online Feb. 1, 2010V.

Bonakdarpour et al., "Impact of loading in RRDE experiments on Fe-N-C catalysts: Two- or four-electron oxygen reduction?," Electrochemical and Solid-State Letters, 2008, vol. 11, pp. B105-B108, available electronically Apr. 10, 2008.

Buckel et al., "Influence of Aromatic Groups Incorporated in Long-Chain Alkanethiol Self-Assembled Monolayers on Gold," Adv. Materials, 2000, vol. 12, pp. 901-905.

Carrero-Sanchez et al., "Biocompatibility and Toxicological Studies of Carbon Nanotubes doped with Nitrogen," Nano Letters, 2006, vol. 6, No. 8, pp. 1609-1616.

Chokai et al., Preparation of carbon alloy catalysts for polymer electrolyte fuel cells from nitrogen-containing rigid-rod polymers. J Power Sources 195, 5947-5951, (2010).

Chung et al., "A Non-Precious Electrocatalyst for Oxygen Reduction Based on Simple Heat-Treated Precursors," ECS Trans., 2008, vol. 16, No. 2, pp. 385-391.

Chung et al., "Synthesis and Evaluation of Heat-Treated, Cyanamide-derived Non-precious Catalysts for Oxygen Reduction," ECS Trans., 2009, pp. 485-492.

Chung et al., "Cyanamide-Derived Non-Precious Metal Catalyst for Oxygen Reduction," Electrochemistry Comm., 2010, vol. 12, pp. 1792-1795.

Faubert et al., "Oxygen reduction catalysts for polymer electrolyte fuel cells from the pyrolysis of FeII acetate adsorbed on 3,4,9,10-perylenetetracarboxylic acid dianhydride," Electrochim. Acta, 1999, vol. 44, pp. 2589-2603.

Gong et al., "Nitrogen-Doped Ordered Carbon Nanotube Arrays with High Electrocatalytic Activity for Oxygen Reduction," Science, 2009, vol. 323, pp. 760-764.

Groenewolt et al., "Synthesis of $g-C_3N_4$ Nanoparticles in Mesoporous Silica Host Matrices," Adv. Mater., Jul. 2005, vol. 17, pp. 1789-1792.

Gupta et al., "Heat-treated polyacrylonitrile-based catalysts for oxygen electroreduction," J. Appl. Electrochem., 1989, vol. 19, pp. 19-27.

Hermann et al., "Influence of Sulfur on the Pyrolysis of CoTMPP as Electrocatalyst for the Oxygen Reduction Reaction," J. Electrochem. Soc., 2009, vol. 156, pp. B1283-B1292, published Aug. 27, 2009.

Jahnke et al., "Organic Dyestuffs as Catalysts for Fuel Cells," Top. Curr. Chem. 1976, vol. 61, pp. 133-181.

Jaouen et al., "Cross-Laboratory Experimental Study of Non-Noble-Metal Electrocatalysts for the Oxygen Reduction Reaction," Appl. Materials & Interfaces, 2009, vol. 8, pp. 1623-1639, published on the web Jul. 20, 2009.

Jasinski, A New Fuel Cell Cathode Catalyst, Nature, 1964, vol. 201, pp. 1212-1213.

Lefevre et al., "Molecular Oxygen Reduction in PEM Fuel Cells: Evidence for the Simultaneous Presence of Two Active Sties in Fe-Based Catalysts," J. Phys. Chem. B, 2002, vol. 106, pp. 8705-8713, published on the web Jul. 27, 2002.

Liu et al., "Nitrogen-Doped Ordered Mesoporous Graphitic Arrays with High Electrocatalytic Activity for Oxygen Reduction," Angew. Chem. Int. Ed., 2010, vol. 49, pp. 2565-2569.

Maldonado et al., "Influence of Nitrogen Doping on Oxygen Reduction Electrocatalysis at Carbon Nanofiber Electrodes," J. Phys. Chem. B, 2005, vol. 109, pp. 4707-4716, published on the web Feb. 19, 2005.

Matter et al., "Non-metal Catalysts for Dioxygen Reduction in an Acidic Electrolyte," Catal. Lett., 2006, vol. 109, pp. 115-123.

Meng et al., "pH-Effect on Oxygen Reduction Activity of Fe-Based Electro-Catalysts," Electrochemistry Comm., 2009, vol. 11, pp. 1986-1989.

Nagaiah et al., "Nitrogen-Doped Carbon Nanotubes as a Cathode Catalyst for the Oxygen Reduction Reactino in Alkaline Medium," Electrochemistry Comm., 2010, vol. 12, pp. 338-341.

Nallathambi et al., "Development of high performance carbon composite catalyst for oxygen reduction reaction in PEM Proton Exchange Membrane fuel cells," J. Power Sources, 2006, vol. 183, pp. 34-42.

Pels et al., "Evolution of nitrogen functionalities in carbonaceous materials during pyrolysis," Carbon, 1995, vol. 33, pp. 1641-1653.

Qu et al., "Nitrogen-Doped Graphene as Efficient Metal-Free Electrocatalyst for Oxygen Reduction in Fuel Cells," AcsNano, 2010, vol. 4, No. 3, pp. 1321-1326.

Schmidt et al., Oxygen electrocatalysis in alkaline electrolyte: Pt(hkl), Au(hkl) and the effect of Pd-modification. Electrochim Acta 47, 3765-3776 (2002).

Shanmugam et al., "Efficient Electrocatalytic Oxygen Reduction Over Metal Free-Nitrogen Doped Carbon Nanocapsules," Chem. Commun., 2011, vol. 47, pp. 4463-4465.

Strelko et al., "On the mechanism of possible influence of heteroatoms of nitrogen, boron and phosphorus in a carbon matrix on the catalytic activity of carbons in electron transfer reactions," Carbon, 2000, vol. 38, pp. 1499-1503.

Wiggins et al., "Effect of Nitrogen Concentration on Capacitance, Density of States, Electronic Conductivity, and Morphology of N-Doped Carbon Nanotube Electrodes," J. Phys. Chem. C., 2009, vol. 113, pp. 19082-19090.

Wood et al., "Non-precious metal oxygen reduction catalyst for PEM fuel cells based on nitroaniline precursor," J. Power Sources, Apr. 2008, vol. 178, pp. 510-516, available online Nov. 17, 2007.

Yang, et al., "Efficient Metal-Free Oxygen Reduction in Alkaline Medium on High-Surface-Area Mesoporous Nitrogen-Doped Carbons Made from Ionic Liquids and Nucleobases," J. Am. Chem. Soc. 2011, 133(2):206-209, available online Dec. 14, 2010.

\* cited by examiner

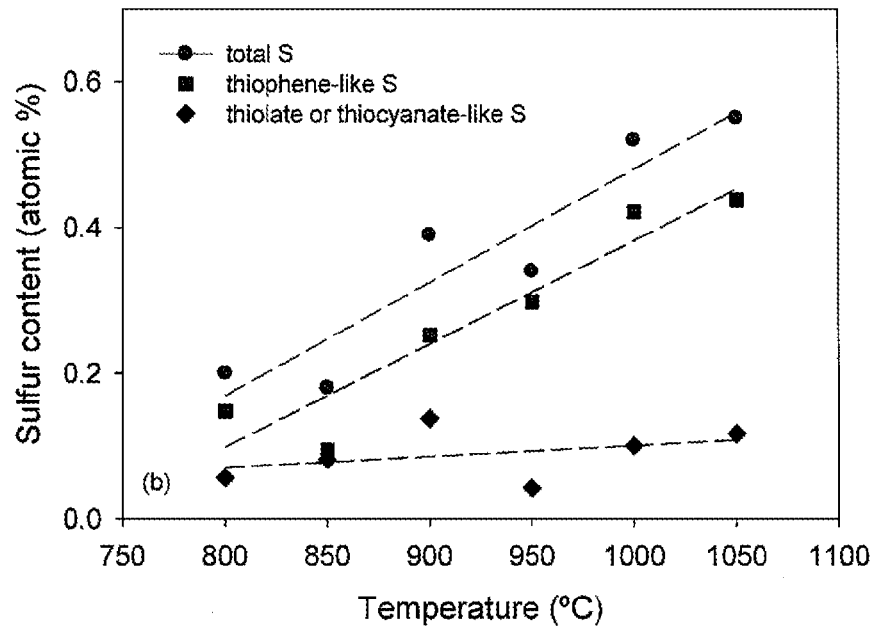
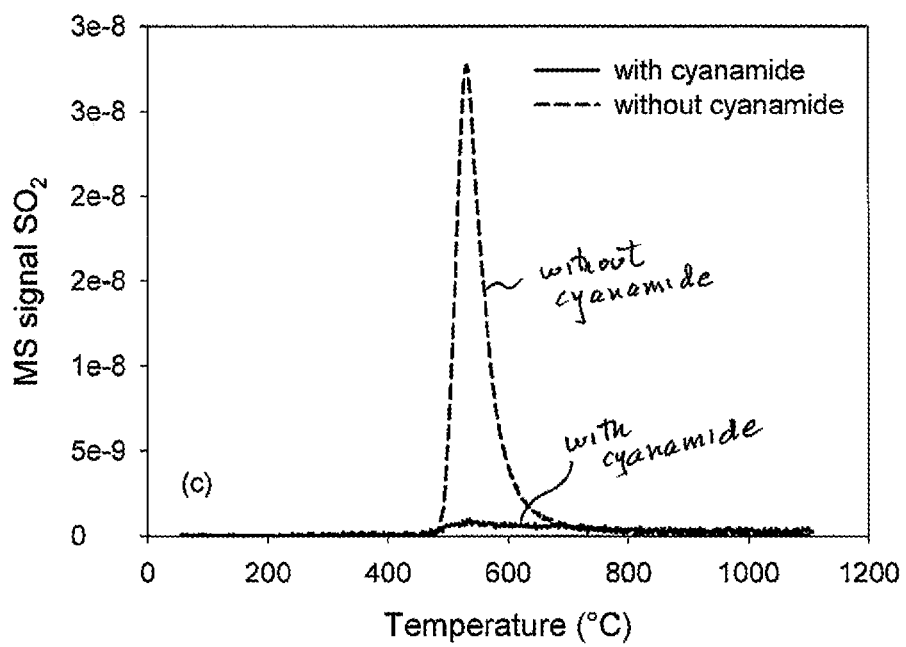
*Fig. 3b (top) and Fig. 3c (bottom)*

Catalytic activity enhanced with increasing S content in the catalyst

NON-PRECIOUS METAL CATALYSTS PREPARED FROM PRECURSOR COMPRISING CYANAMIDE

RELATED APPLICATIONS

This application claims the benefit of U.S. Provisional Application No. 61/384,883 entitled "Non-Precious Metal Catalysts" filed Sep. 21, 2010 and U.S. Provisional Application No. 61/408,129 entitled "Non-Precious Metal Catalysts" filed Oct. 29, 2010, both incorporated by reference herein.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF THE INVENTION

The present invention relates to novel catalysts suitable for use in fuel cells and in particular, in alkaline fuel cells, comprising a metal, a nitrogen source such as cyanamide (CM), a sulfur source and a carbon source.

BACKGROUND OF THE INVENTION

Among several types of fuel cells, polymer electrolyte fuel cells (PEFCs) are the best suited for transportation vehicles because of fast startup time, low sensitivity to orientation, and favorable power-to-weight ratio. Though relatively low temperature operation at around 80° C. makes fast startup possible, it also requires the use of scarce, expensive platinum-based catalysts especially for the oxygen reduction reaction (ORR) at the cathode. A need exists, therefore, for non-precious metal catalysts suitable for use in fuel cells, which exhibit a catalytic activity similar to precious metal catalysts.

The potential use of non-precious materials instead of Pt in the PEFC cathode has recently received increased attention due to cost analyses that have demonstrated a pressing need. Transition metal-nitrogen-carbon (M-N—C) type catalysts have been studied for almost 50 years since the discovery of their ORR activity in macrocycles bound with transition metals, and considered as the best non-precious metal catalyst to substitute for platinum in PEFCs.

According to previous reports, the most important element of active site(s) in M-N—C catalysts is the nitrogen. Nitrogen in the carbon can exist as pyridinic type (contributing one p-electron to p band), and pyrrole type (contributing two p-electrons to p band). Pyridinic nitrogen can exist only on the edge of the graphene layer, while pyrrolic nitrogen can exist both on the edge of and within the graphene layer. Experimental and quantum mechanical calculation results strongly show that pyridinic and pyrrolic nitrogen are closely related with the activities of M-N—C catalysts.

The effect of sulfur on the ORR catalytic activity has been rarely studied. However, sulfur has a high potential to enhance the activity of ORR in a manner similar to both pyridinic and pyrrolic nitrogen because sulfur resembles the pyridinic nitrogen in that sulfur also has a lone pair of electrons, and sulfur also resembles the pyrrolic nitrogen in that both contribute two p electrons to the pi band of graphene layer.

SUMMARY OF THE INVENTION

The present invention meets the aforementioned need by providing novel non-precious metal catalysts suitable for use in fuel cells, which comprise a sulfur-containing moiety (i.e. metal-nitrogen-sulfur-carbon, or "MNSC" catalysts). Embodiment catalysts of the present invention were produced using a cyanamide precursor.

Sulfur evaporates during pyrolysis, and is therefore difficult to stabilize into the carbon. However, cyanamide is capable of stabilizing the sulfur into the carbon during pyrolysis, resulting in increased ORR activity of the catalyst. In proton exchange membrane fuel cells (PEMFCs), platinum-based catalysts are currently used for both anode and cathode catalysts. Expensive platinum is currently needed for oxygen reduction in the cathode side due to the high overpotential. Replacing an expensive platinum based catalyst with an inexpensive carbon based catalyst would have a tremendous impact on one of the main obstacles to commercializing PEMFCs, namely the high cost of precious metals. In addition, the embodiment catalysts of the present invention function well in alkaline fuel cells, and further may have a number of applications in the chlor-alkali industry and in metal-air batteries.

The following describe some non-limiting embodiments of the present invention.

An embodiment catalyst prepared by a process comprising heating a mixture of cyanamide, carbon black, and a salt selected from an iron sulfate salt and an iron acetate salt at a temperature of from about 700° C. to about 1100° C. under an inert atmosphere, and thereafter removing acid soluble components from the mixture, and thereafter heating the mixture at a temperature of from about 700° C. to about 1100° C. under an inert atmosphere to form the catalyst.

An embodiment membrane electrode assembly prepared by a process comprising:

preparing a catalyst by heating a mixture of cyanamide, carbon black, and a salt selected from an iron sulfate salt and an iron acetate salt at a temperature of from about 700° C. to about 1100° C. under an inert atmosphere and thereafter removing acid soluble components from the mixture, and thereafter heating the mixture at a temperature of from about 700° C. to about 1100° C. under an inert atmosphere to form the catalyst.

mixing the catalyst with water and with an ionomer suspension to form a catalyst composition;

applying the catalyst composition onto a first side of a membrane;

applying the catalyst composition onto a first side of a gas diffusion layer;

forming a membrane electrode assembly by placing the first side of the membrane in direct contact with the first side of the gas diffusion layer; and applying heat and pressure to the membrane electrode assembly.

According to another embodiment of the present invention, a catalyst comprising graphitic carbon is provided, said graphitic carbon comprising a metal species, a nitrogen-containing species and a sulfur-containing species.

According to another embodiment of the present invention, a method of forming a catalyst is provided, comprising mixing a cyanamide precursor material, a metal-sulfate precursor material and carbon black to form a graphitic $C_3N_4$ compound; heating the mixture at a temperature of from about 800° C. to about 1100° C. in an inert atmosphere; and removing acid-soluble components from the mixture.

According to another embodiment of the present invention, a method of forming a membrane electrode assembly is provided, comprising providing a catalyst having graphitic carbon, said graphitic carbon including a metal species, a nitrogen-containing species, and a sulfur-containing species;

mixing the catalyst with water; mixing the catalyst and the water with an ionomer suspension to form a catalyst composition; applying the catalyst composition onto a first side of a membrane; applying the catalyst composition onto a first side of a gas diffusion layer; forming a membrane electrode assembly by placing the first side of the membrane in direct contact with the first side of the gas diffusion layer; applying heat and pressure to the membrane electrode assembly.

DETAILED DESCRIPTION OF THE INVENTION

In the present invention, cyanamide was selected as the nitrogen precursor, capable of forming graphitic-$C_3N_4$ under certain pyrolysis conditions. Graphitic-$C_3N_4$ (g-$C_3N_4$) has a high nitrogen content, which is often associated with ORR activity in non-precious metal catalysts. Cyanamide was found to aid the incorporation of sulfur from the iron sulfate precursor into the carbon.

Embodiment non-precious ORR catalysts were synthesized by mixing 2.0 g cyanamide (CM) and 1.5 g $FeSO_4 \cdot 7H_2O$ (or 1.1 g $Fe(CH_3COO)_2$) with 1.0 g oxidized carbon (Ketjenblack EC-300J), pretreated in 70% nitric acid at 80° C. for 8 hours. After mixing, two heat-treatment steps followed at 700-1100° C. in nitrogen atmosphere. The temperature of both heat-treatment steps was kept the same, and so a single heat-treatment temperature is referred to for each sample. Between heat-treatments, the catalyst was leached in 0.5 M $H_2SO_4$ at 80° C. for 8 hours in order to remove acid-soluble components.

A cathode catalyst ink for the membrane-electrode assembly (MEA) was prepared by thoroughly blending an embodiment catalyst prepared as described above with de-ionized water and recast Nafion® ionomer (5% Nafion® suspension in alcohols; SOLUTION TECHNOLOGY, INC). The catalyst:water:ionomer weight ratios were about 1:20:0.6. The catalyst ink was dispersed ultrasonically for 90 seconds(s) and then hand-brushed onto the membrane and gas diffusion layer (GDL). 0.25 mg $cm^{-2}$ Pt (catalyzed cloth GDL, E-TEK) was used as the anode. The membranes used in this experiment were Nafion®117. MEA was hot-pressed at 120° C. for 90 s. A 5-$cm^2$ cell was used for fuel cell testing.

X-ray photoelectron spectroscopy (XPS) measurements were performed on a KRATOS Axis Ultra spectrometer using an Mg Kα X-ray source. A DYCOR DYMAXION quadrupole mass spectrometer was used for the mass analyses. The product gas concentration of the samples heated from room temperature to 1050° C. at a rate of 5° C./min in Ar at a flow rate of 25 mL/min was analyzed for masses up to 100.

The data obtained for the embodiment catalysts indicate that as much as about 70% of platinum activity at 0.8 V is approached, which is currently the highest activity reported. The data are summarized in the Figures, which are described in further detail below.

Figure 1A:
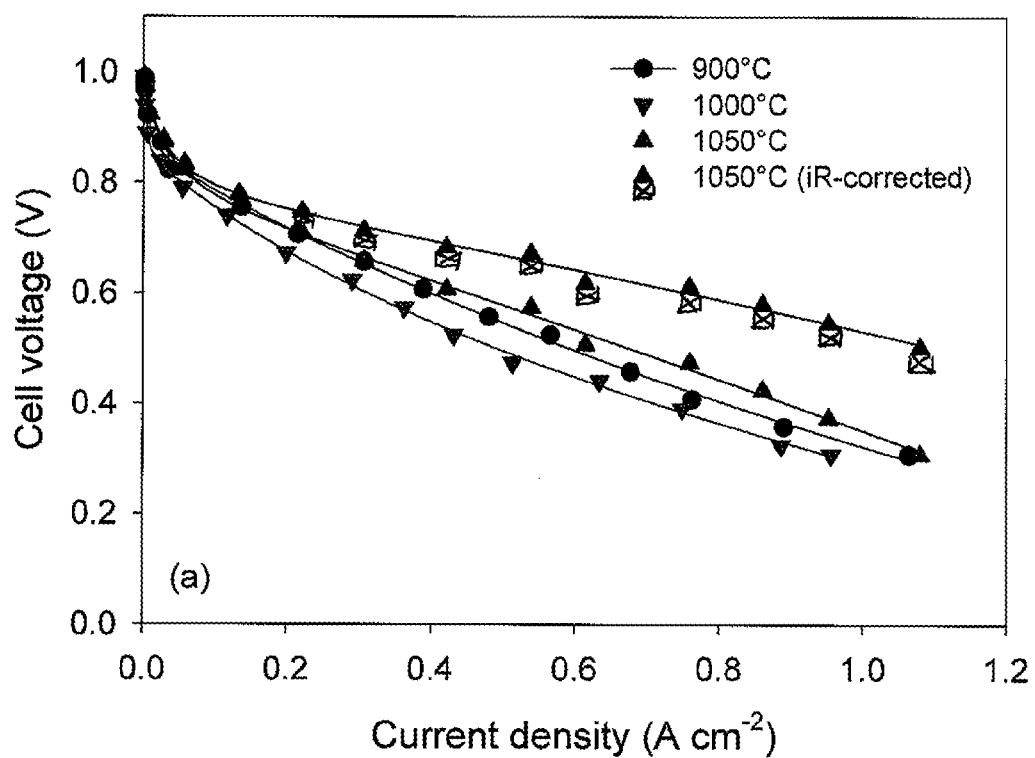
FIG. 1: (a) Fuel cell polarization plots recorded with $FeSO_4 \cdot 7H_2O$—CM-Ketjenblack ORR catalysts obtained at different heat-treatment temperatures. (b) Fuel cell polarization plots recorded with $Fe(CH_3COO)_2$—CM-Ketjenblack ORR catalysts obtained at different heat-treatment temperatures. (c) Fuel cell polarization plots comparison with $FeSO_4 \cdot 7H_2O$—CM-Ketjenblack heat-treated at 1050° C. and $Fe(CH_3COO)_2$—CM-Ketjenblack heat-treated at 1000° C. Nafion® 117 membrane; anode—30 psig $H_2$, 0.25 mg $cm^{-2}$ Pt (catalyzed-cloth GDL, E-TEK); cathode—30 psig $O_2$, non-precious catalyst loading 4.0 mg $cm^{-2}$ (double-sided cloth GDL, E-TEK); humidification for $H_2$ and $O_2$ was 100% RH; constant 300/500 standard mL per minute anode/cathode flow rates for $H_2$ and $O_2$ respectively; MEA surface area 5 $cm^2$.
Figure 1B:
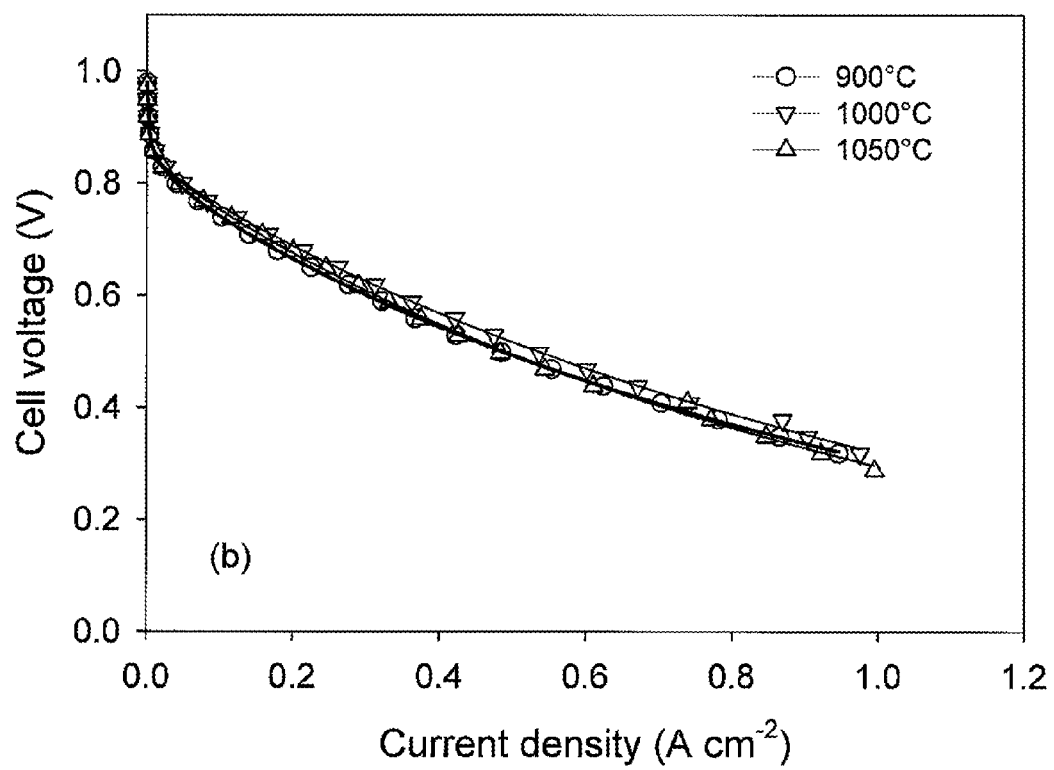

FIGS. 1(a, b and c) displays the results of $H_2$—$O_2$ fuel cell tests of the CM-derived (i.e. cyanamide-derived) catalysts with different iron sources ($FeSO_4 \cdot 7H_2O$ and $Fe(CH_3COO)_2$). For CM-$FeSO_4 \cdot 7H_2O$-KB (KB=Ketjenblack) 900° C. and 1050° C. heat-treated catalysts, the OCV is about 1.0 V in both cases and the current densities are 70 mA and 83 mA (105 mA for iR-corrected) at 0.80 V, respectively. Based on these values, the CM-derived catalysts compare favorably to the top five most active non-precious metal catalysts recently reviewed. One property of the CM-$FeSO_4 \cdot 7H_2O$-KB derived catalyst is an unusual dependence of activity on the synthesis temperature, observed in both RDE and fuel cells tests. Improvement in catalyst performance is observed up to a heat-treatment temperature of 900° C., but the performance decreases when the catalyst is pyrolyzed at 1000° C. Interestingly, the highest performance is attained when the heat-treatment temperature is further increased to 1050° C. (This activity dependence on temperature is also observed with Black Pearls 2000™ as a carbon support; data not shown). This is an unusual phenomenon compared to other reports that show a volcano-type plot of activity versus pyrolysis temperature, and CM-$Fe(CH_3COO)_2$-KB catalysts (FIG. 1 b). Such behavior is believed to be related to the identity of the active site(s). The two most notable characteristics of CM-derived catalysts can be summarized as (i) high. ORR activity, and (ii) unusual activity dependence on temperature.

Figure 2A:
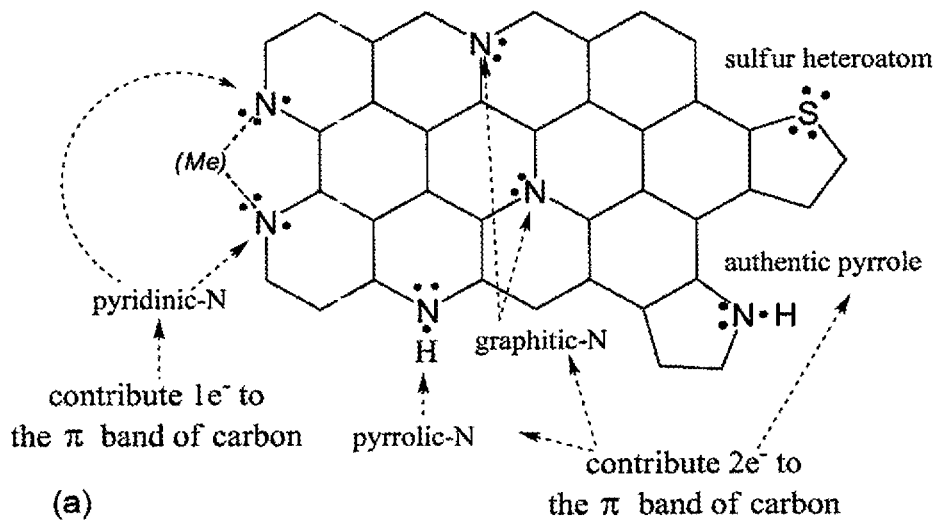
FIG. 2: (a) A schematic diagram of pyridinic, pyrrolic, graphitic, and authentic pyrrole nitrogen and thiophene sulfur incorporated into the graphene carbon layer. (b) one electron ($e^-$) donor-type and two $e^-$ donor-type and total nitrogen content variation with heat-treatment temperatures determined by N 1s XPS. One $e^-$ donor-type nitrogen content was determined from B.E. 398.8 eV, and two $e^-$ donor-type nitrogen content from B.E. 400.2 and 401.4 eV. Total nitrogen content was obtained from the sum of pyridine-type and pyrrole-type nitrogen content.

According to previous reports, the nitrogen content and type present in M-N—C catalysts is important for ORR activity. As depicted in FIG. 2(a), there are several types of nitrogen species that can be largely classified as "two p electrons donor" (to the pi-band of carbon) and "one p electron donor" (to the pi-band of carbon). The two p electrons donor species (especially graphitic and pyrrolic-N) are expected to lower the carbon band gap energy and possibly promote catalytic activity. The one p electron donor (pyridinic-N) specie also has a lone pair of electrons available for binding with metal atoms (see FIG. 2(a)); indeed, this pyridinic nitrogen content has been the most closely correlated to the activities of M—N—C catalysts.

Figure 2B:
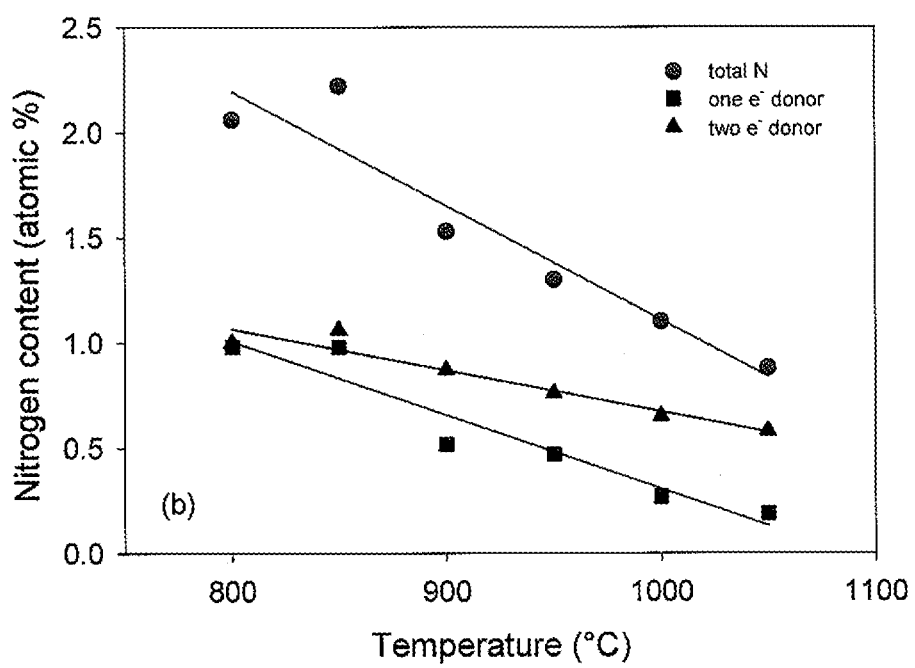

Using these categories to label the nitrogen, the XPS peak at 398.8 eV (pyridinic-N) was assigned as "one e⁻ donor", and the XPS peaks appearing at 400.2 eV (pyrrolic-N) and 401.4 eV (graphitic-N) were labeled as "two e⁻ donor" to construct the plot in FIG. 2(b). Clearly, the total nitrogen content (from 1.5 to 1.0%), the "one e⁻ donor", and the "two e⁻ donor" nitrogen content all decrease monotonically with increasing pyrolysis temperature. The decrease in nitrogen content of all types does not match the unusual pattern of the ORR activity results discussed above. (Note that using other definitions of nitrogen type does not reveal any correlating pattern.) Therefore, other factors must be considered to explain the relatively high activities of CM-FeSO$_4$.7H$_2$O-KB based catalysts and unusual activity increase at 1050° C.

Figure 3A:
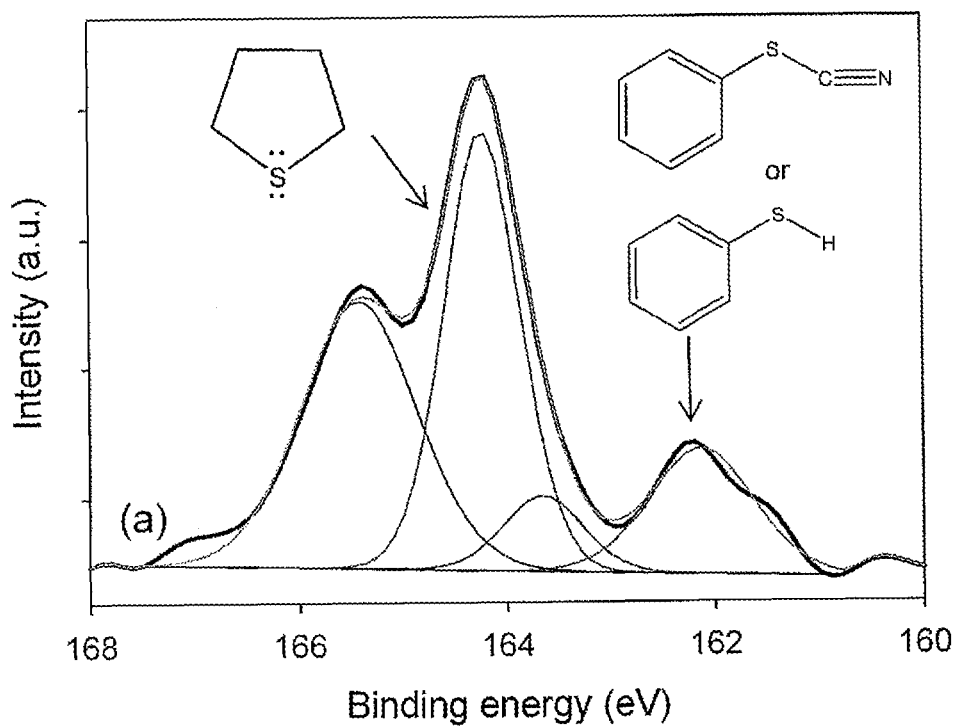
FIG. 3: (a) XPS S 2p spectra of the pyrolyzed cyanamide-derived catalyst at 1050° C. and (b) Total, thiophene-like and thiolate (or thiocyanide)-like sulfur content variation with temperatures determined by XPS. (c) Ionic current of the mass spectroscopy of $SO_2$ of $FeSO_4 \cdot 7H_2O$-Ketjenblack samples obtained with and without the addition of cyanamide; (m/e=64 $SO_2$).

The CM-FeSO$_4$.7H$_2$O-KB-based catalyst discussed herein contains sulfur due to the iron source, ferrous sulfate 7-hydrate (FeSO$_4$.7H$_2$O). FIG. 3(a) shows S 2p spectra of 1050° C. heat-treated catalysts; the other catalysts show the similar pattern. The first two peaks (162.3 eV and 163.4 eV) and second two peaks (164.4 eV and 165.7 eV) are doublet structures due to spin-orbit coupling ($S_{2p3/2}$ and $S_{2p1/2}$). The peak at 164.4 eV has been attributed previously to $S_{2p3/2}$ of thiophene, and the peak at 162.3 eV has been assigned before to $S_{2p3/2}$ of thiolate or thiocyanate. Comparing the intensities of both peaks, sulfur is found to exist mainly as thiophene, as depicted in FIG. 3 (a). The total and thiophene-type sulfur content in the catalyst increases with temperature, as shown in FIG. 3(b). In a previous report, sulfur in sulfate form did not react with carbon to form C-heteroatoms, in contrast to these results. FIG. 3 (c) shows the evolution of SO$_2$ (mass 64), as detected by mass spectrometry during the first heat treatment of samples composed of FeSO$_4$.7H$_2$O mixed with Ketjenblack. EC-300J™, both with and without the addition of cyanamide. With cyanamide, the decomposition of the sulfate and evolution of SO$_2$ is greatly depressed, indicating that an interaction between cyanamide and sulfate (or sulfate-derived species) stabilizes sulfur in the sample perhaps through the formation of C—S bonds.

Figure 1C:
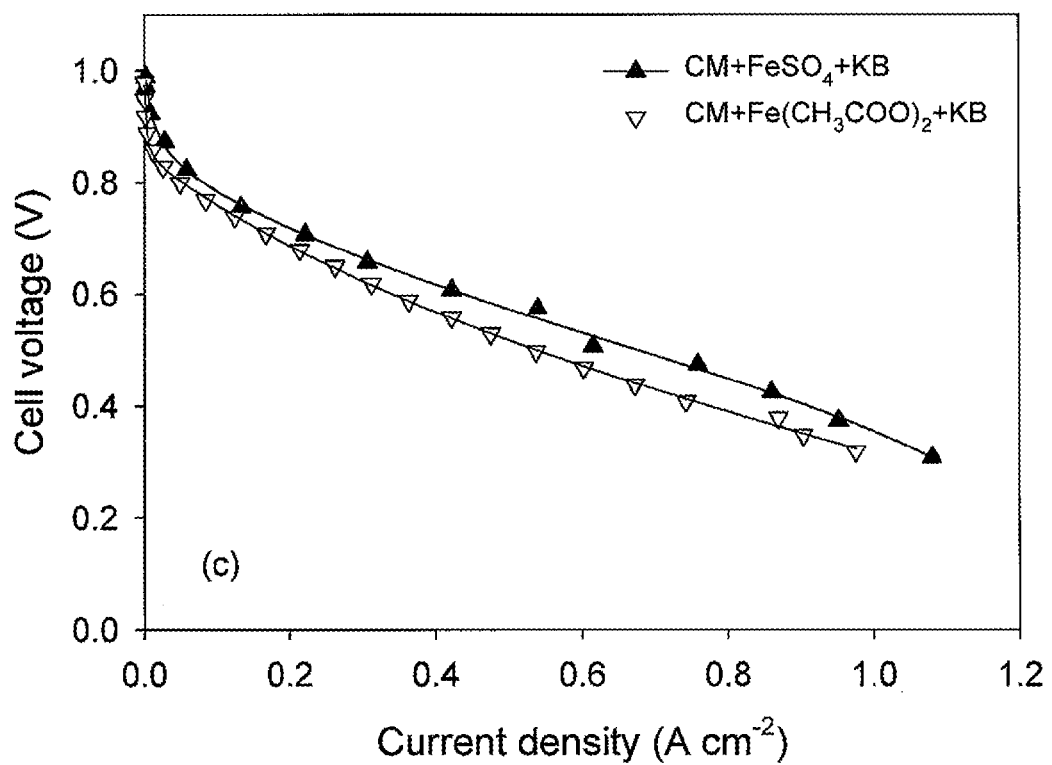

To further investigate whether sulfur enhances the ORR activity of the CM-based catalyst, samples were prepared using iron(II) acetate as the iron source rather than iron sulfate, thus avoiding any sulfur addition. The performance of these catalysts at high voltage/low current density (under kinetic rather than mass-transport control) was half that of the catalyst prepared from the iron sulfate precursor, as shown in FIG. 1(c). This difference strongly indicates that sulfur is responsible for the improved activity of CM-based catalysts.

The effect of sulfur on the ORR catalytic activity has been rarely studied. As shown in FIG. 2(a), however, sulfur has the potential to enhance ORR activity in the same manner as "one e⁻ donor" and "two e⁻ donor" nitrogens. Sulfur resembles the "one e⁻ donor" nitrogen in having a lone pair of electrons, which can possibly interact with metal atoms. It also resembles "two e⁻ donor" nitrogen by having two p electrons that can interact with the π band of graphene layer. Consequently, the high ORR activity in spite of a decreasing amount of nitrogen of all types and unusual activity dependence on temperature in CM-FeSO$_4$.7H$_2$O-KB derived catalyst could possibly be explained by the beneficial effect of sulfur incorporated into the graphene carbon.

Figure 4:
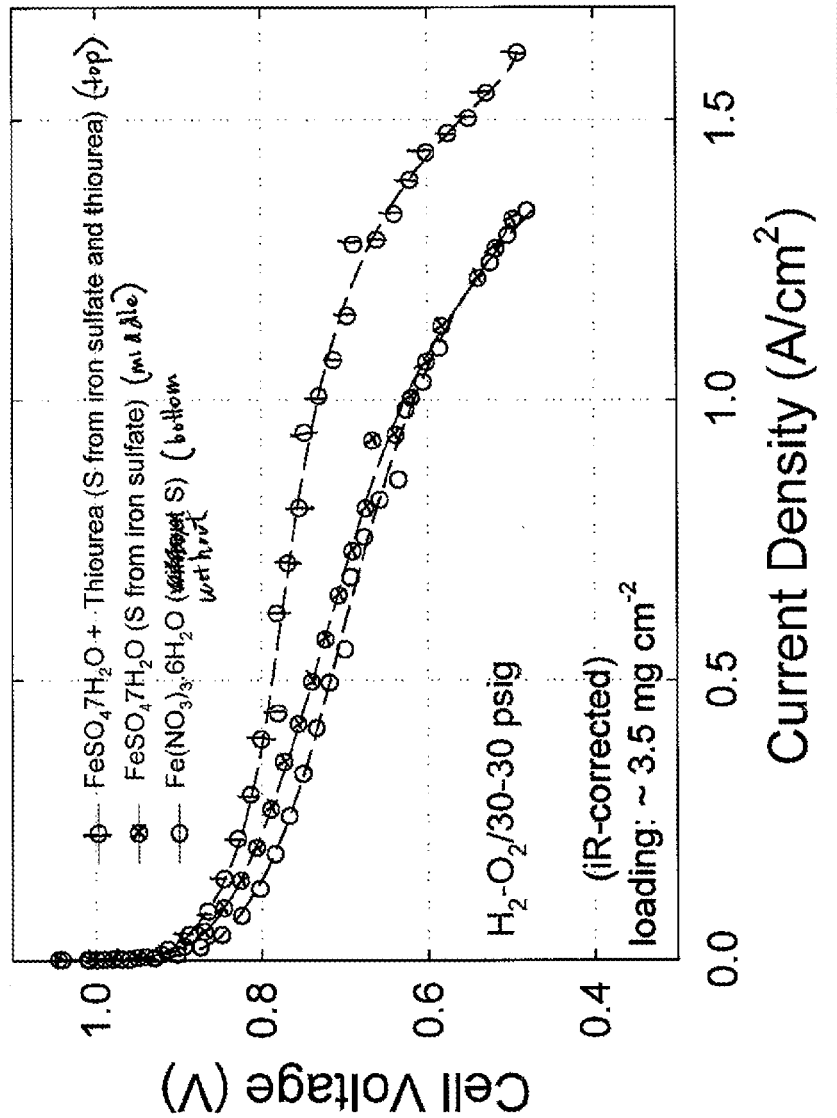
FIG. 4 shows the effect of S on the catalytic activity, in particular, how activity is enhanced with increasing S content in the catalyst.

FIG. 4 shows a plot of cell voltage (in volts) versus current density in amperes per square centimeter) for two catalysts prepared using iron sulfate (top two graphs) and a catalyst prepared using ferric nitrate. The graphs show the effect of S on the catalytic activity, in particular, how activity is enhanced with increasing S content in the catalyst.

Figure 5A:
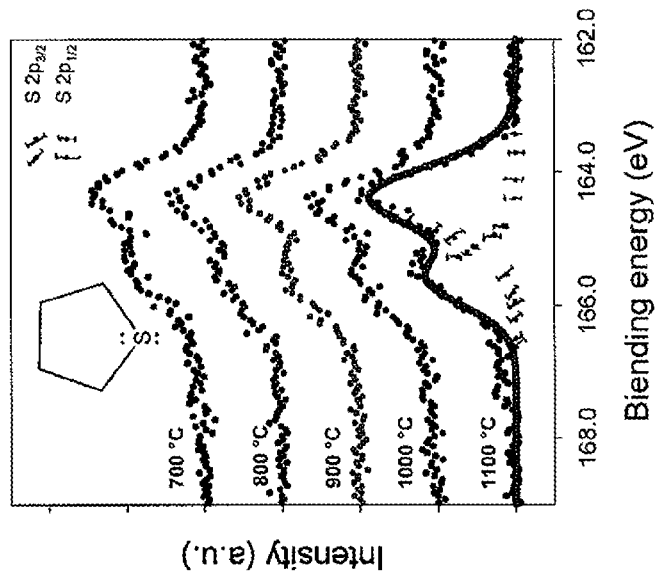
FIG. 5 shows S—Fe—C catalytic activity, in particular, that even S—Fe—C can show catalytic activity for Oxygen Reduction Reaction (ORR).
Figure 5B:
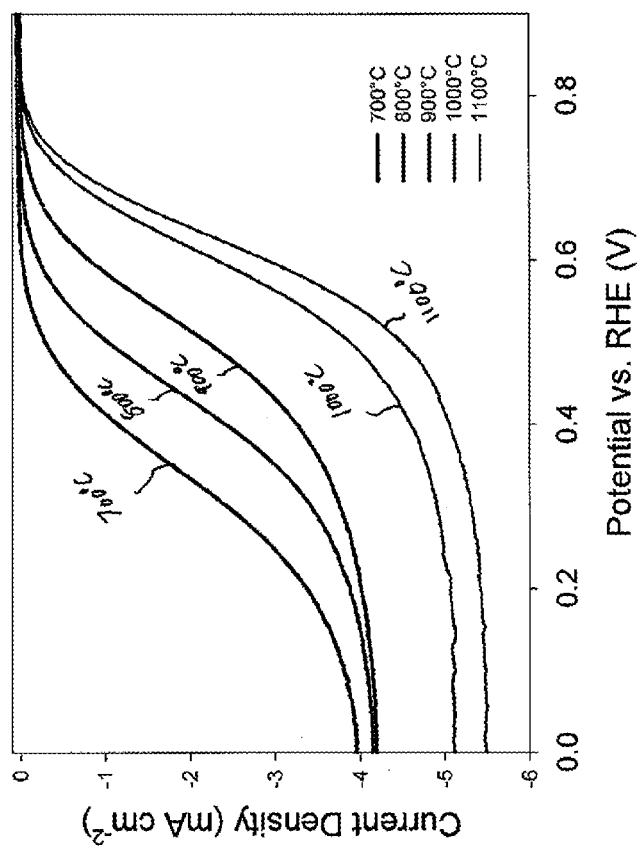

FIG. 5 (a) shows x-ray photoelectron spectra for thiophene p electrons plotted as intensity versus binding energy (in electron volts) at 5 different temperatures. This plot shows that the S present in the embodiment catalysts is similar to the S present in thiophene, which is believed to be a new catalytic active site for ORR. FIG. 5(b) The plot at the left is current density versus potential. The topmost graph corresponds to heat treatment at 700° C. during the synthesis of the catalyst. The next plot directly below corresponds to heat treatment at 800° C., the next to 900° C., the next to 1000° C., and the bottom plot to 1100° C. The catalyst loading was 600 micrograms per square centimeter. The electrolyte was 0.1 molar HClO$_4$. The graph shows that S—Fe—C can show catalytic activity for Oxygen Reduction Reaction (ORR).

Figures 6A, 6B:
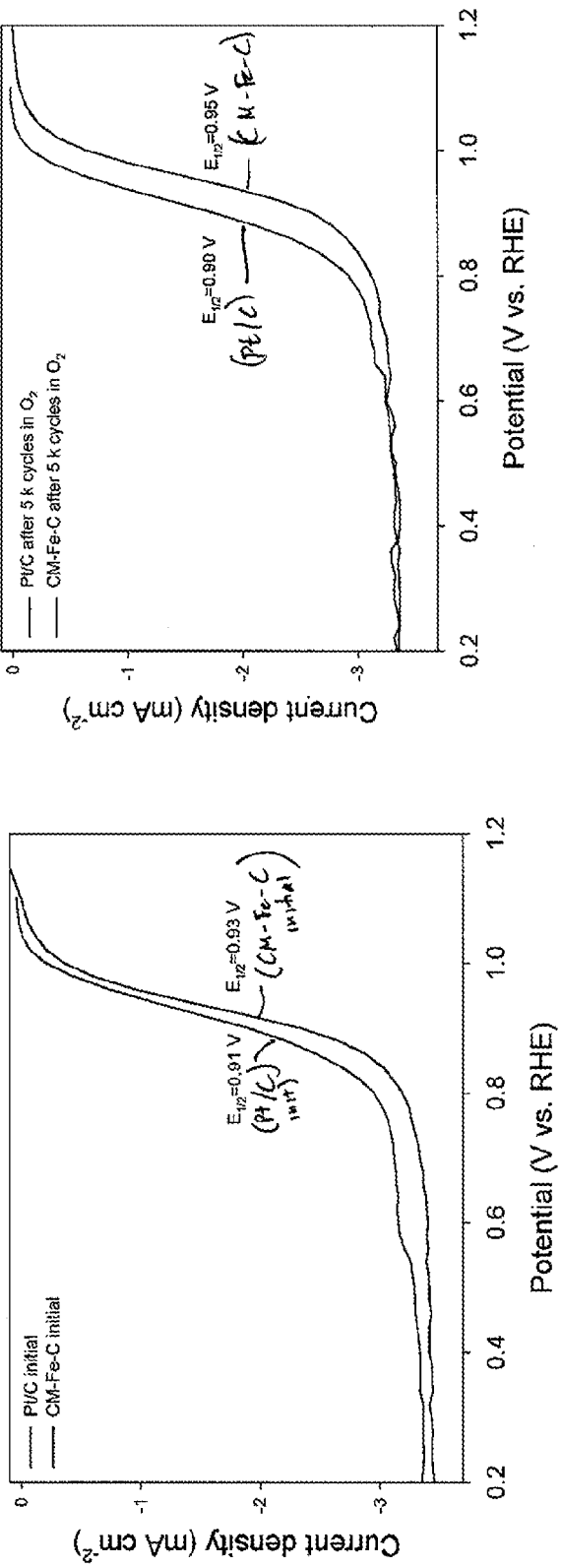
FIG. 6 shows ORR activity of carbon-based NPM catalyst in alkaline solution, in particular, that the carbon-based catalyst, when compared to platinum-based catalysts, shows comparable catalytic activity and better durability in an alkaline solution (pH 13).

FIG. 6 (a) shows a plot of current density versus potential for a PVC catalyst and an embodiment cyanamide-derived catalyst for the initial cycle. The E1/2 for the Pt-based catalyst is 0.91 volts while that for the embodiment catalyst is 0.93 volts. FIG. 6 (b) shows a plot similar to that of FIG. 6(a) but after 5000 cycles in O2. As the plot shows, the E1/2 for the Pt-based catalyst is equal to 0.90 volts while that for the embodiment catalyst is 0.95 volts. Thus, the ORR activity of an embodiment carbon-based NPM catalyst in alkaline solution is comparable to platinum-based catalysts, and with better durability in an alkaline solution (pH 13) compared to the Pt-based catalyst.

Figure 7:
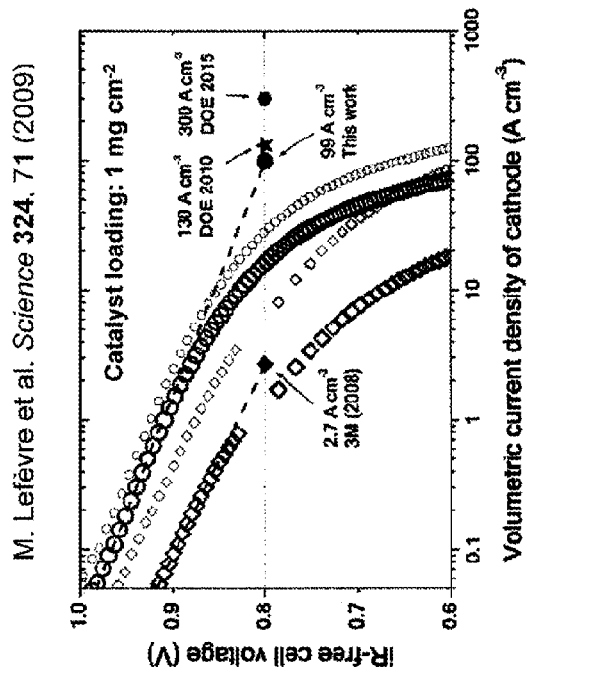
FIG. 7 summarizes data that show a higher activity of an embodiment N—S—Fe—C catalyst compared to the state-of-the-art N—Fe—C catalyst.
Figure 7:
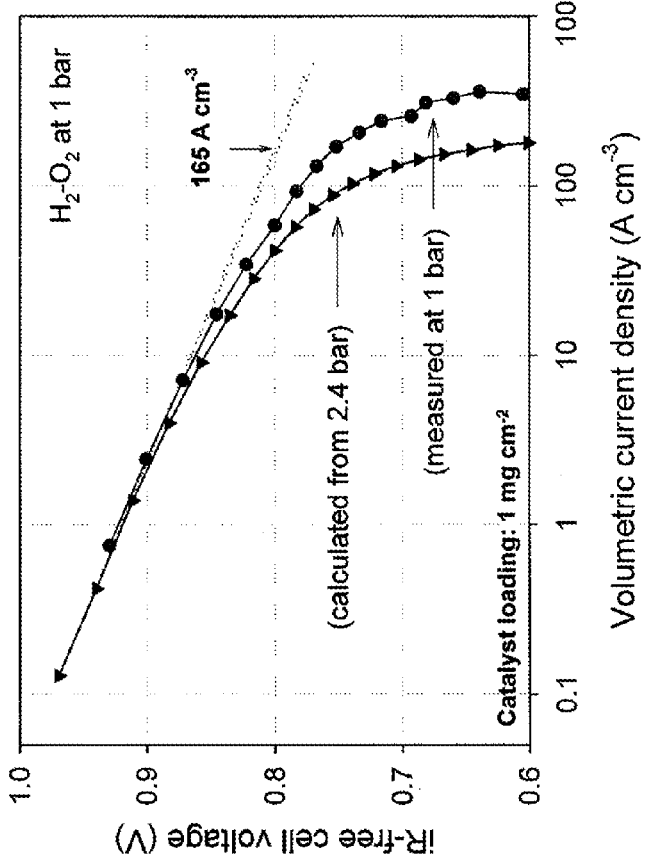

FIG. 7 compares the activities of a state-of-the-art N—Fe—C catalyst taken from M, Lefevre et al., Science, vol. 324, p. 71 (2009) with the activity of an embodiment N—S—Fe—C. As FIG. 7 shows, the embodiment N—S—Fe—C catalyst shows a higher activity compared to the activity of the state-of-the-art N—Fe—C catalyst.

In all embodiments of the present invention, all percentages are by weight of the total composition, unless specifically stated otherwise. All ratios are weight ratios, unless specifically stated otherwise. All ranges are inclusive and combinable. All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Whereas particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A catalyst prepared by a process comprising:
    heating a mixture of cyanamide, carbon black, and an iron sulfate salt at a temperature of from about 1050° C. to about 1100° C. under an inert atmosphere, and
    removing acid-soluble components from the mixture.

2. The catalyst of claim 1, wherein said catalyst comprises a graphitic carbon.

3. The catalyst of claim 2, wherein said catalyst comprises a pyridinic nitrogen and a pyrrole nitrogen.

4. A membrane electrode assembly prepared by a process comprising:

preparing a catalyst by heating a mixture of cyanamide, carbon black, and an iron sulfate salt at a temperature of from about 1050° C. to about 1100° C. under an inert atmosphere and thereafter removing acid-soluble components from the mixture and thereafter heating the mixture from about 1050° C. to about 1100° C. under an inert atmosphere to form the catalyst, mixing the catalyst with water and with an ionomer suspension to form a catalyst composition;

applying the catalyst composition onto a first side of a membrane;

applying the catalyst composition onto a first side of a gas diffusion layer;

forming a membrane electrode assembly by placing the first side of the membrane in direct contact with the first side of the gas diffusion layer; and applying heat and pressure to the membrane electrode assembly.

5. A method of forming a catalyst comprising:

a) mixing a cyanamide precursor material, a metal-sulfate precursor material and carbon black to form a graphitic $C_3N_4$ compound;

b) heating the mixture at a temperature of from about 1050° C. to about 1100° C. in an inert atmosphere; and, c) removing acid-soluble components from the mixture.

\* \* \* \* \*